RELAXATION OSCILLATOR HAVING HIGH IMMUNITY TO CHANGES IN SUPPLY VOLTAGE

Filed March 10, 1964

INVENTORS,
HENRY P. KALMUS
KLAUS H. SANN
BY Harry M. Saragovitz,
Edward J. Kelly, Herbert Berl & J. D. Edgerton
ATTORNEYS United States Patent Office 3,283,263

Patented Nov. 1, 1966

3,283,263

RELAXATION OSCILLATOR HAVING HIGH IMMUNITY TO CHANGES IN SUPPLY VOLTAGE

Henry P. Kalmus, Washington, D.C., and Klaus H. Sann, Kensington, Md., assignors to the United States of America as represented by the Secretary of the Army Filed Mar. 10, 1964, Ser. No. 350,919
10 Claims. (Cl. 331—111)

Figures 1, 2:
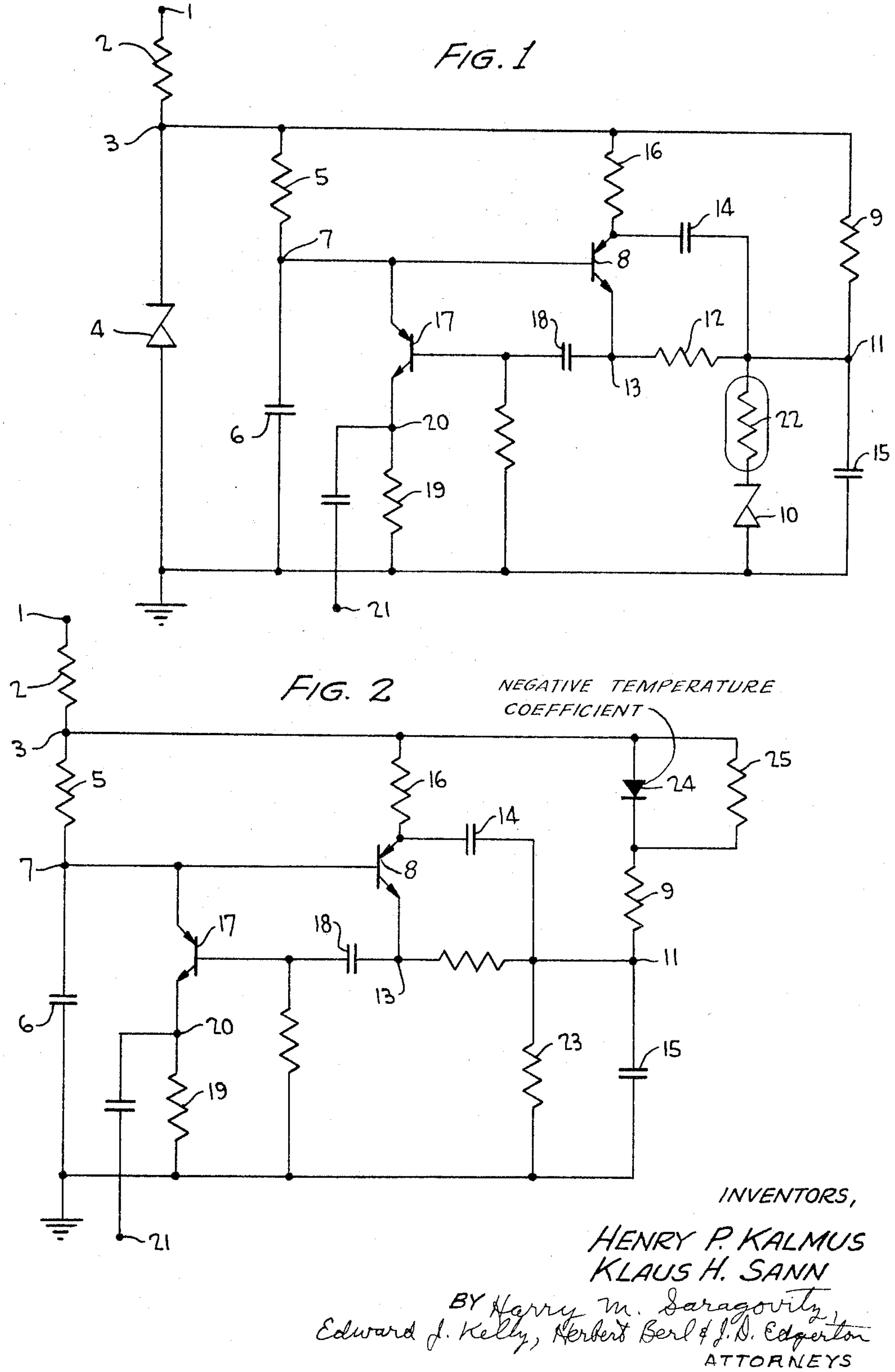

The invention described herein may be manufactured and used by or for the Government of the United States of America for governmental purposes without the payment to us of any royalty thereon.

This invention relates generally to solid state timers, and more particularly to improved solid state relaxation oscillator circuits having output frequencies which are highly stable under the influence of changes in temperature and supply voltage.

The frequency of a relaxation oscillator is determined by the time of charging a capacitor through a current limiting resistor and the time of discharging the capacitor when the voltage across it reaches some predetermined value. It is usual in prior art circuits to employ a gas discharge tube or other similar device connected across the capacitor for the purpose of sensing the voltage across the capacitor. When the voltage across the capacitor reaches the break-down voltage of the gas discharge tube, the tube conducts providing a discharge path for the capacitor. The capacitor discharges until the voltage across it reaches the quenching voltage of the tube at which time the tube becomes non-conducting. The period of oscillation is described by the folowing equation:

$$t=RC1n\left\{\frac{V-V_Q[1-k(T_0-T)]}{V-V_B[1-k(T_0-T)]}\right\}+t_D$$

where $t$ is the period of oscillation in seconds, R is the resistance of the current limiting resistor in ohms, C is the capacitance of the capacitor in farads, V is the supply voltage, $V_B$ is the break-down voltage of the gas discharge tube, $V_Q$ is the quenching voltage of the gas discharge tube, $k$ is the temperature coefficient of the gas discharge tube in per degree centigrade, $T_0-T$ is the change in temperature in degrees centigrade, and $t_D$ is the discharge time in seconds. $t_D$ is several orders of magnitude smaller than $t$ and may therefore be neglected. Taking the total differential of the above expression and normalizing gives the frequency shift as a function of temperature and supply voltage:

$$\frac{df}{f}=-\frac{dt}{t}\sim \left\{\frac{kTV_Q}{V-V_Q[1+k(T_0-T)]}-\frac{kTV_\beta}{V-V_B[1+k(T_0-T)]}\right\}\frac{dT}{T}+\left\{\frac{V(V_Q-V_\beta)}{(V-V_Q)(V-V_B)}\right\}\frac{dV}{V}$$

The above expression is only approximate, a logarithmic term and certain insignificant terms having been omitted. For the frequency of the relaxation oscillator to be independent of temperatue and supply voltage variations, the above expression must be made to equal zero.

It is an object of this invention to provide an improved solid state relaxation oscillator circuit which has an output frequency which is relatively independent of changes in temperature and supply voltage.

It is another object of the present invention to provide temperature compensation for PNPN devices in relaxation oscillator circuits.

It is a further object of the instant invention to provide a relaxation oscillator circuit having zener diode controlled reference voltage levels.

It is yet another object of the subject invention to provide a relaxation oscillator circuit having a bridge circuit for establishing reference voltage levels.

According to the present invention, the foregoing and other objects are attained by providing a relaxation oscillator circuit having a separate voltage sensor which triggers a capacitor discharge switch in combination with novel temperature compensation and reference voltage level circuitry.

The specific nature of the invention, as well as other objects, aspects, uses and advantages thereof, will clearly appear from the following description and from the accompanying drawing, in which:

FIG. 1 is a schematic diagram of one embodiment of the invention which employs zener diodes to establish reference voltage levels; and FIG. 2 is a schematic diagram of another embodiment of the invention which employs a bridge circuit to establish reference voltage levels.

Referring now to the drawing wherein like reference numerals designate identical or corresponding parts, and more particularly to FIGURE 1 wherein a supply voltage source (not shown) is connected to the relaxation oscillator circuit at junction 3 by way of terminal 1 and resistor 2. Zener diode 4 is connected between junction 3 and ground to establish a first reference voltage level which is hereinafter designated as $V_1$. Connected across zener diode 4 is a current limiting resistor 5 and a charging capacitor 6. The voltage across capacitor 6 is sensed by PNPN switch 8 which has its gate electrode connected to the junction 7 of current limiting resistor 5 and charging capacitor 6. Resistor 9 and zener diode 10 comprise a voltage divider which is connected between junction 3 and ground. Zener diode 10 establishes a second reference voltage level at junction 11 which is hereinafter designated as $V_2$. While capacitor 6 is charging through current limiting resistor 5, no current flows through resistor 12; therefore, the potential at junction 13 is the same as at junction 11 or $V_2$. Capacitor 6 will charge to a voltage equal to $V_2$ plus the firing voltage of switch 8. The firing voltage of switch 8 is defined as that voltage between the gate electrode and junction 13 which renders switch 8 conductive. This voltage is hereinafter designated as $V_3$. When capacitor 6 has charged to a voltage equal to $V_2+V_3$, switch 8 conducts and discharges capacitor 14 through resistor 12. Capacitor 15 provides an A.C. path to ground for transients caused by the discharge pulse. Capacitor 14 is charged through resistor 16, the time constant of resistor 16 and capacitor 14 being much smaller than the time constant of resistor 5 and capacitor 6. The discharge current of capacitor 14 through resistor 12 develops a positive pulse at junction 13. This pulse is coupled to the gate electrode of PNPN switch 17 through capacitor 18. Switch 17 is connected across capacitor 6 and discharges capacitor 6 through load resistor 19 to ground when rendered conductive by a positive pulse at its gate electrode. The current supplied by resistor 16 is insufficient to sustain conduction of switch 8; therefore, switch 8 stops conducting after capacitor 14 has been discharged. The negative going voltage at junction 7 accelerates the process which causes switch 8 to cease conducting and allows the use of a smaller resistance for resistor 16. Capacitor 14 again charges through resistor 16. The capacitor 6 discharges until the voltage between junctions 7 and 20 is insufficient to sustain the conduction of switch 17. The remaining voltage across capacitor 6 just after switch 17 becomes non-conductive is hereinafter designated as $V_4$. The voltage pulse developed across load resistor 19 during the discharge of capacitor 6 appears at output terminal 21.

The voltages $V_3$ and $V_4$ vary with temperature. The period of oscillation of the circuit shown in FIGURE 1 is expressed as follows:

$$t=R_5C_6 \ln \frac{V_1-V_4[1+k_4(T_0-T)]}{V_1-V_2-V_3[1+k_3(T_0-T)]}$$

where $k_3$ is the temperature coefficient of switch 8 in per degree centigrade, and $k_4$ is the temperature coefficient of switch 17 in per degree centigrade. The coefficients $k_3$ and $k_4$ are both negative. Taking the differential of the above expression and normalizing gives the frequency shift as a function of temperature:

$$\frac{df}{f}=-\frac{dt}{t}\sim \left\{\frac{k_3TV_3}{V_1-V_2-V_3[1+k_3(T_0-T)]}-\frac{k_4TV_4}{V_1-V_4[1+k_4(T_0-T)]}\right\}\frac{dT}{T}$$

The relaxation oscillator becomes independent of temperature under the following condition:

$$k_4V_4=k_3V_3\frac{V_1-V_4[1+k_4(T_0-T)]}{V_1-V_2-V_3[1+k_3(T_0-T)]}$$

$k_4V_4$ is dependent on the peak current through switch 17, therefore, adjusting the value of load resistor 19 and thereby adjusting the peak current through switch 17 allows temperature compensation. For example, with $V_1=19.5$ volts and resistor 19 adjusted to 100 ohms provides temperature compensation of $0.8\times 10^{-3}$ for $T-T_0=70°$ C. Additional temperature compensation is achieved by resistor 22 having a positive temperature coefficient in series with zener diode 10. Since $k_3$ is negative, the sum of the voltages $V_2$ and $V_3$ remains substantially constant for a change in temperature.

The zener diodes used to establish reference voltage levels in the circuit shown in FIGURE 1 are omitted in the circuit shown in FIGURE 2. The reference voltage levels in the latter circuit are established by a bridge circuit which comprises resistor 5, capacitor 6, resistor 9 and resistor 23. Resistor 25, shunted by conductive diode 24, is connected in series with resistor 9. Resistors 9 and 25 and diode 24 constitute one arm of the bridge. Resistor 5 and diode 24 are added to provide temperature compensation of switch 8 in a manner that will be set forth more fully below. Switches 8 and 17 and their related circuitry operate in the same manner as in the circuit shown in FIGURE 1. Neglecting temperature considerations for the moment, the period of the relaxation oscillator circuit is expressed as follows:

$$t=R_5C_6 \ln \frac{V_1-V_4}{V_1-V_2-V_3}$$

where the several voltages are the same as defined in connection with the analysis of the circuit shown in FIGURE 1. In this circuit, however, $V_2$ is a function of the supply voltage $V_1$ and is expressed as follows:

$$V_2=\frac{R^2}{R_1+R_2}V_1 \text{ or } V_2=KV_1$$

By proper selection or adjustment of the value of resistor 25 with which diode 24 is shunted, the compensating effect of diode 24 can be adjusted from maximum (resistor 25 infinite) to zero (resistor 25 zero). Such temperature compensating schemes are not in themselves novel. Substituting, the expression for the period set forth above becomes:

$$t=R_5C_6 \ln \frac{V_1-V_4}{V_1(1-K)-V_3}$$

Taking the differential of the above expression and normalizing gives the frequency shift as a function of supply voltage $V_1$:

$$\frac{df}{f}=-\frac{dt}{t}\sim\frac{-V_3+V_4\left(1-\frac{V_2}{V_1}\right)}{V_1-V_2}\frac{dV_1}{V_1}$$

It can be seen from the above expression that the frequency of the oscillator would be independent of the supply voltage if $V_3=V_4(1-K)$, where $$K=\frac{V_2}{V_1}=\frac{R_2}{R_1+R_2}$$

A change of 1% in frequency has been measured for a 20% supply voltage change.

Temperature compensation of switch 17 is accomplished in the same manner as in the circuit shown in FIGURE 1; that is by adjusting load resistor 19. Temperature compensation of switch 8 is accomplished by diode 24 connected in shunt with resistor 25. Diode 24 has a negative temperature coefficient which causes the summation of the voltages $V_2$ and $V_3$ to remain substantially constant for changes in temperature. By proper selection or adjustment of the value of resistor 25 with which diode 24 is shunted, the compensating effect of diode 24 can be adjusted from maximum (resistor 25 infinite) to zero (resistor 25 zero). Such temperature compensating schemes are not in themselves novel.

The following analysis may facilitate an understanding of the manner in which reference voltages are obtained in the embodiments of FIGURES 1 and 2 as disclosed above. In both embodiments it is desired to minimize the effect on frequency of variations in supply voltage applied to terminal 1. In both embodiments this minimization is accomplished by circuitry that maintains substantially constant, irrespective of variations in the D.-C. voltage supplied to terminal 1, the ratio of the reference voltage at circuit point 11 to the voltage at circuit point 3 from which capacitor 6 is charged through resistor 5. In the FIGURE 1 embodiment the desired constant ratio is accomplished by holding substantially constant the absolute values of the voltages at terminals 3 and 11 by means of zener diodes 4 and 10 respectively. In the FIGURE 2 embodiment the desired constant ratio is accomplished by letting point 11 be a tap on a resistive voltage divider connected between point 3 and ground, so that the ratio remains constant even though the absolute value of the voltage at point 3 may vary.

It will be apparent that the embodiments shown are only exemplary and that various modifications can be made in construction and arrangement within the scope of the invention as defined in the appended claims.

We claim as our invention:

1. A relaxation oscillator comprising:

(a) a circuit ground, (b) first and second circuit points, (c) a current-limiting resistor and a charging capacitor connected in series between said first circuit point and ground, said resistor and capacitor being joined at a first junction, (d) first means connected to said first circuit point for suplying direct current to said first circuit point, (e) second means connected between said second circuit point and said first circuit point, and third means connected between said second circuit point and ground, whereby a reference voltage is derived at said second circuit point from the direct current applied to said first circuit point, (f) fourth means for sensing the difference voltage between the voltage across said capacitor and said reference voltage and having an output terminal for providing a first pulse when said voltage attains a predetermined value, said fourth means comprising:

(1) a second resistor and a second capacitor connected in series between said first and second circuit points, (2) a first load resistor having one end connected to said second circuit point, (3) a three-terminal semiconductor switch having its control terminal connected to said first junction and its other two terminals connected to discharge said second capacitor through said semiconductor switch and said first load resistor, thereby developing a voltage pulse across said first load resistor when said difference voltage attains a predetermined value, and (g) fifth means having two output terminals connected across said charging capacitor and having an input terminal connected to said output terminal of said fourth means, said fifth means being adapted to discharge said charging capacitor in response to said first pulse.

2. A relaxation oscillator according to claim 1, wherein said fifth means comprises:

(a) a second load resistor having one terminal connected to circuit ground, (b) a second three-terminal semiconductor switch having its control electrode connected to receive said voltage pulse and to be rendered conductive thereby and having its other two terminals connected in series between said second load resistor and said first junction, (c) whereby said charging capacitor is discharged through said second load resistor and said second three-terminal switch thereby developing a voltage pulse across said second load resistor.

3. A relaxation oscillator according to claim 2, said switches being PNPN switches.

4. A relaxation oscillator according to claim 1, comprising additionally:

(a) a first zener diode connected between said first circuit point and ground for holding substantially constant the voltage at said first circuit point, and (b) a second zener diode connected in a conductive path between said second circuit point and ground for holding substantially constant the voltage at said second circuit point.

5. A relaxation oscillator according to claim 3, comprising additionally:

(a) a first zener diode connected between said first circuit point and ground for holding substantially constant the voltage at said first circuit point, and (b) a second zener diode connected in a conductive path between said second circuit point and ground for holding substantially constant the voltage at said second circuit point.

6. A relaxation oscillator according to claim 1, wherein said second and third means are resistors.

7. A relaxation oscillator according to claim 3, wherein said second and third means are resistors.

8. A relaxation oscillator according to claim 3, wherein said second load resistor has a value chosen to limit to peak current through said second semiconductor switch thereby providing temperature compensation for the circuit.

9. A relaxation oscillator according to claim 7, wherein a conductive diode is shunted across a portion of said second means, said diode having a temperature coefficient of the same polarity as the polarity of the temperature coefficient of said first semiconductor switch, thereby providing additional temperature compensation.

10. A relaxation oscillator according to claim 4, wherein there is provided a compensating resistor in series with said second zener diode, said compensating resistor having a temperature coefficient of a polarity opposite to the polarity of the temperature coefficient of said first semiconductors switch thereby providing additional temperature compensation.

References Cited by the Examiner

UNITED STATES PATENTS

| | | | |
|---|---|---|---|
| 2,767,378 | 10/1956 | Hass | 331—153 X |
| 2,952,818 | 9/1960 | Russell et al. | 331—113 |
| 3,074,028 | 1/1963 | Mammano | 331—111 |

ROY LAKE, *Primary Examiner.*

J. B. MULLINS, *Assistant Examiner.*